United States Patent

Pecorino et al.

[11] Patent Number: 5,264,765
[45] Date of Patent: Nov. 23, 1993

[54] VIDEO DISPLAY SCREEN COVER

[76] Inventors: Philip A. Pecorino, 140 Mayfair AVe., Floral Park, N.Y. 11001; Aldo Medaglia, 37-10 33rd St., Long Island City, N.Y. 11101

[21] Appl. No.: 858,548

[22] Filed: Mar. 27, 1992

[51] Int. Cl.⁵ .............................................. H04N 5/64
[52] U.S. Cl. .................................. 318/265; 318/286; 318/466; 160/23.1
[58] Field of Search ................ 177/180, 181; 220/331; 248/291; 292/216, 225; 312/292; 439/77, 78, 79; 361/380, 424; 318/265, 266, 267, 286, 466, 467, 468; 160/1, 23.1, 34, 98, DIG. 10; 902/8, 20, 21, 30, 41; 49/139

[56] References Cited

U.S. PATENT DOCUMENTS

| | | |
|---|---|---|
| 2,801,844 | 8/1957 | Cook . |
| 2,805,059 | 9/1957 | Green . |
| 3,807,480 | 4/1974 | Smart . |
| 3,996,415 | 12/1976 | Provorse ............... 174/48 |
| 4,329,716 | 5/1982 | Porco ...................... 358/231 |
| 4,921,330 | 5/1990 | Takahashi et al. ............ 350/128 |
| 4,949,651 | 8/1990 | Frank et al. ................. 109/24.1 |
| 5,042,866 | 8/1991 | Cody ......................... 269/97.4 |
| 5,052,459 | 10/1991 | Grossenbacher ............ 160/122 |
| 5,087,041 | 2/1992 | Gagmon .................... 273/54 R |
| 5,097,885 | 3/1992 | Kitagawa ................... 160/84.1 |
| 5,116,261 | 5/1992 | Lan et al. ................... 312/292 |
| 5,122,890 | 6/1992 | Makow ....................... 359/63 |
| 5,138,462 | 8/1992 | Skovgaard .................. 358/254 |
| 5,199,697 | 4/1993 | Yamada et al. .............. 271/122 |
| 5,199,773 | 4/1993 | Price, Jr. et al. ............ 312/7.2 |

Primary Examiner—Bentsu Ro
Attorney, Agent, or Firm—Darby & Darby

[57] ABSTRACT

A cover unit for a flat panel video display, for deploying a flexible cover over the display. The cover unit can be separate from the display, both of which can be mounted on or in a wall or the cover unit and flat panel display can be in this same housing which can be mounted on or within a wall.

16 Claims, 4 Drawing Sheets

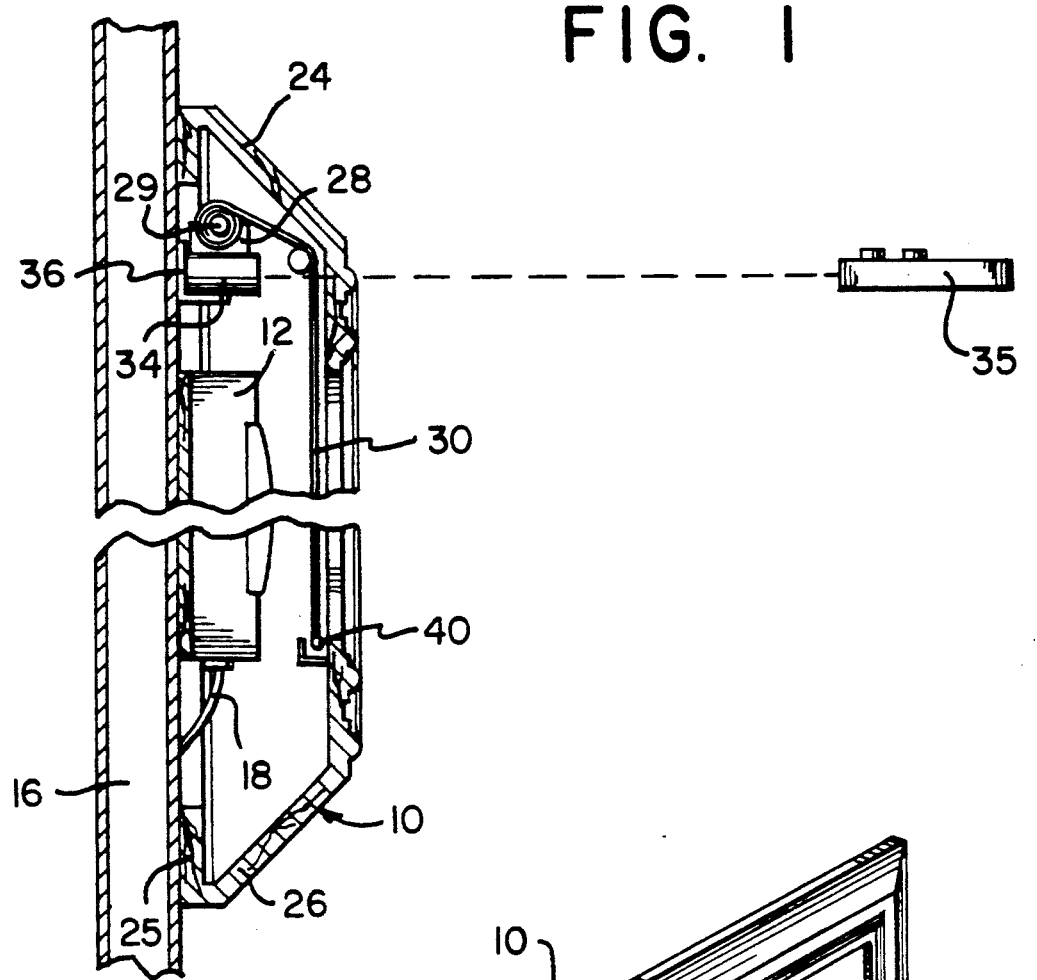

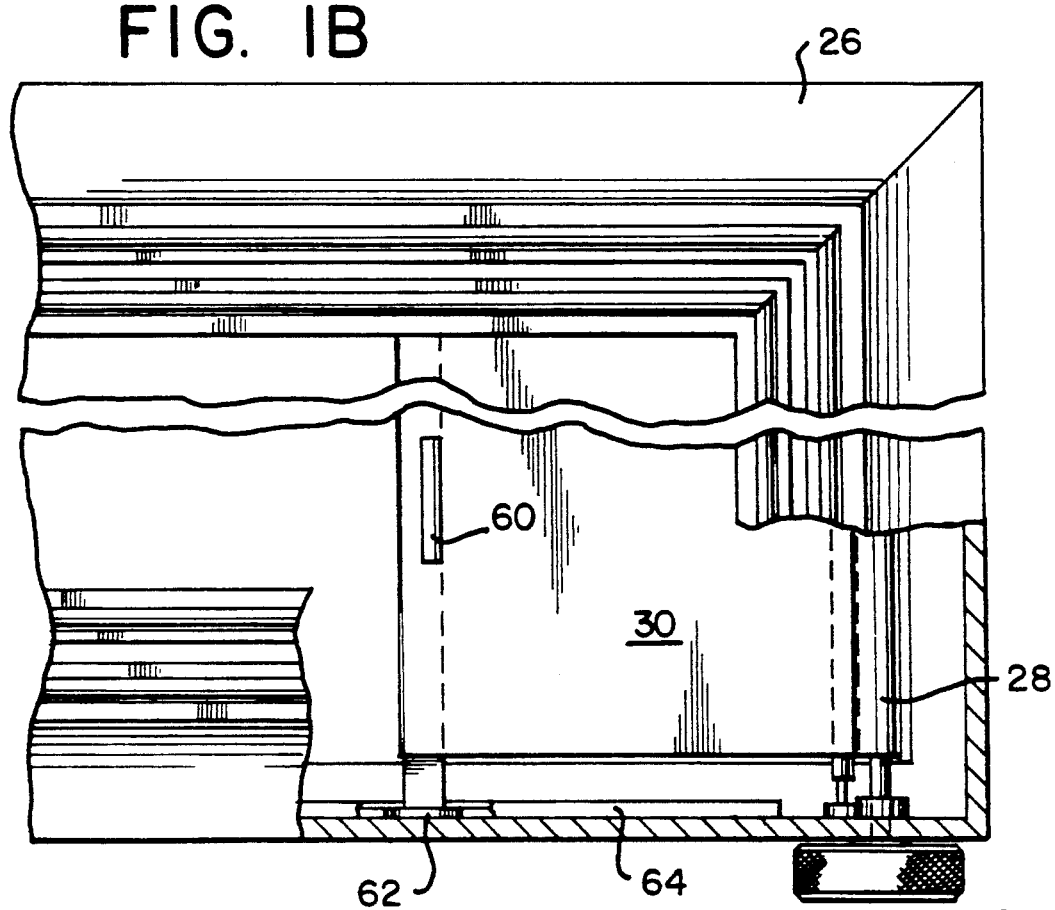
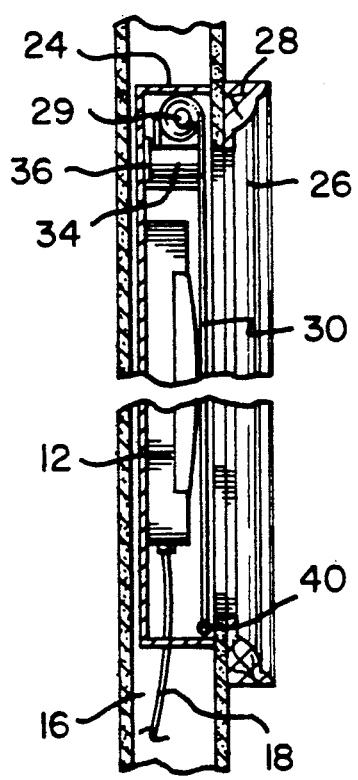
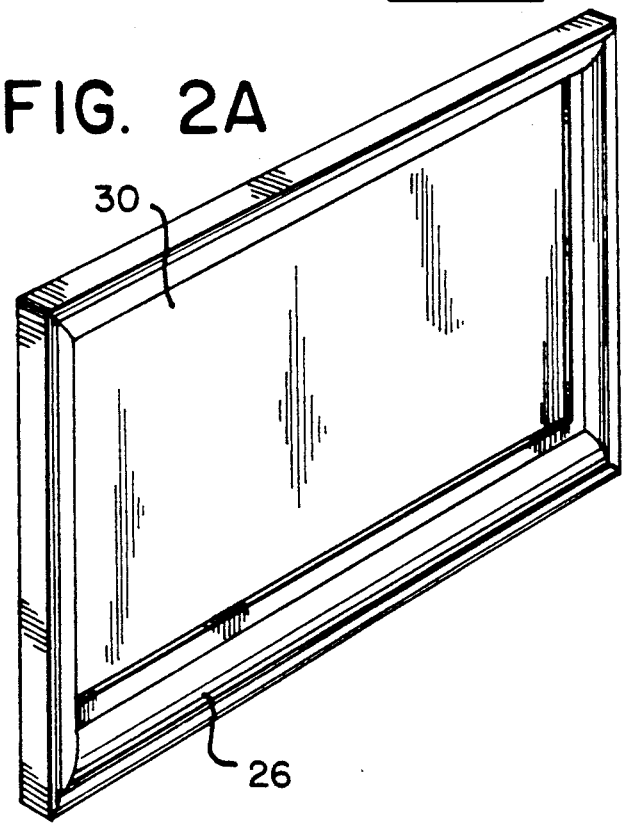

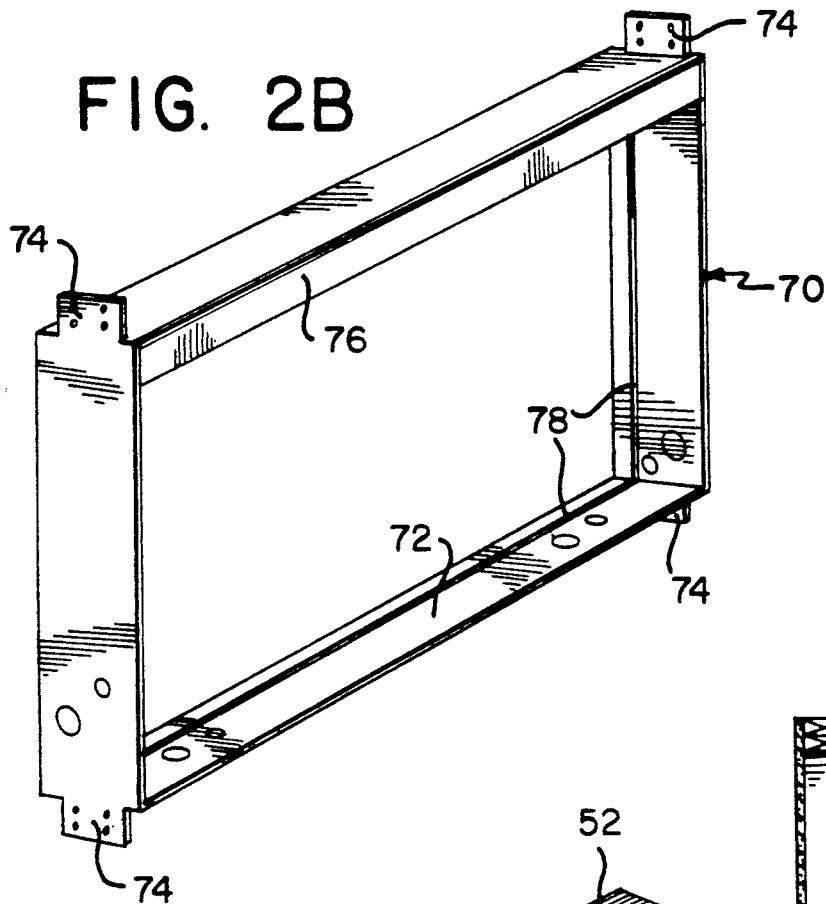
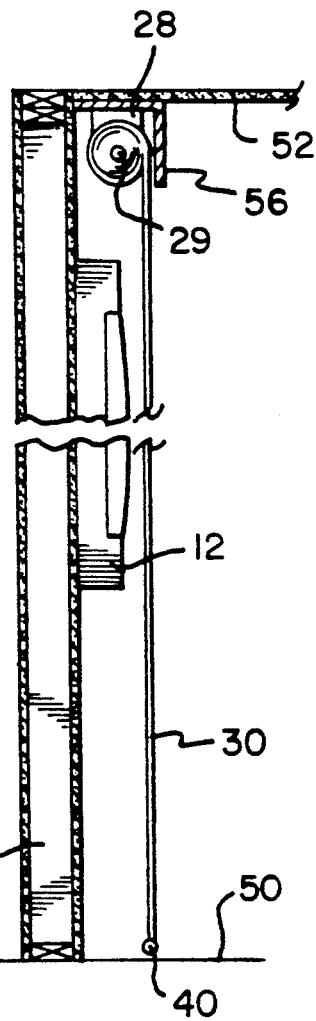
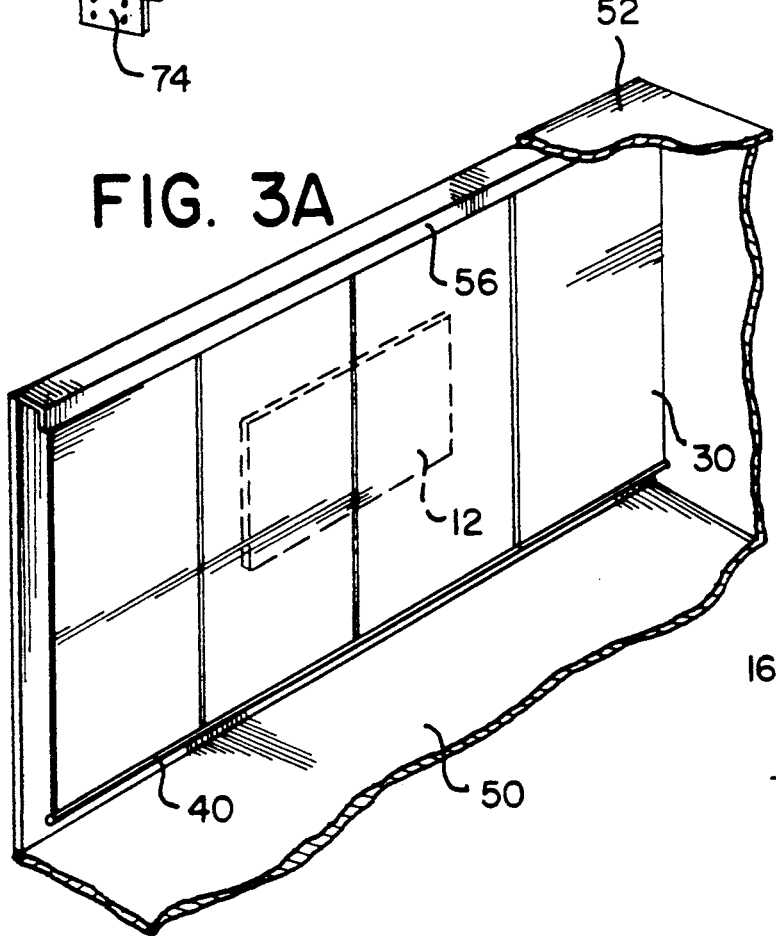

VIDEO DISPLAY SCREEN COVER

BACKGROUND OF THE INVENTION

The use of flat panel video displays is becoming increasingly widespread. Such displays of the flat panel type, are relatively thin and do not utilize an elongated cathode ray tube. As such, they have applications where they can be mounted either vertically, such as on a base support or pedestal, or on a wall. In addition to being used in applications where relatively small displays are required, e.g. a lap top computer, such flat panel displays also have use for larger displays, such as displaying television pictures.

While such large flat panel displays perform their intended function of displaying any type of a video signal, they are exposed to view. By virtue of such exposure, they are subject to damage. Also, some people consider that the presence of the screen by itself is not aesthetically pleasing.

BRIEF DESCRIPTION OF THE INVENTION

The present invention is directed to various types of covers for a flat panel video display. In accordance with the invention, a number of arrangements are provided wherein a flat panel display can be covered by a screen which is moved over the display.

In a preferred embodiment of the invention, an integral unit is provided which houses the display as well as a cover which can be placed over the display. The unit includes a cover mounted on a motor-driven roller. Motor actuation is accomplished by a switch or, if desired, by a programmable remote control, such as the type of remote control usually provided for a television receiver or VCR and programmed to be activated by the same remote control signal supplied for the TV receiver or VCR as programmed into the remote control.

OBJECTS OF THE INVENTION

It is therefore an object of the present invention to provide various arrangements for covering a flat panel video display.

Another object is to provide a cover for a video display which is an integral part of a frame unit housing the display.

An additional object is to provide a frame unit for installation into a wall, the frame unit being adopted for holding the cover, display and other parts of the display unit.

A further object is to provide a cover for a flat panel video display which can be placed on a wall.

Still an additional object is to provide a flat panel video display with a cover as part of an integral unit which can be mounted within the wall.

Yet another object is to provide a cover for a flat panel display which is mounted within the wall.

BRIEF DESCRIPTION OF THE DRAWINGS

Other objects and advantages of the present invention will become more apparent upon reference to the following specification and annexed drawings in which:

FIG. 1 is a cross-sectional view of one embodiment of the invention having a display and cover as part of a single unit for mounting on a wall;

FIG. 1A is a perspective view of the unit of FIG. 1;

FIG. 1B is an elevational view, partly in section, of a modification of the unit of FIGS. 1A and 1B;

FIG. 2 is a cross-sectional view of a unit having the display panel and cover for mounting within a wall;

FIG. 2A is a perspective view of the unit of FIG. 2;

FIG. 2B is a perspective view of a frame unit box;

FIG. 3 is a cross-sectional view of a cover unit for use with a display mounted in the wall;

FIG. 3A is a perspective view of the unit of FIG. 3;

DETAILED DESCRIPTION OF THE INVENTION

Figure 4:
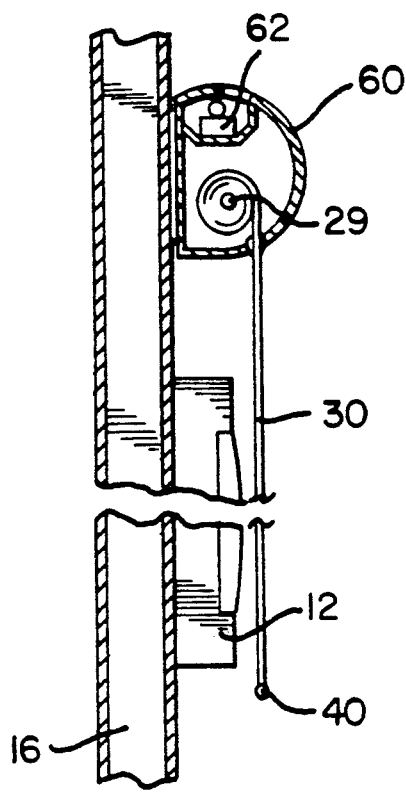
FIG. 4 is a cross-sectional view of a cover unit for a flat panel video display which is mounted on the wall.

Referring to FIGS. 1 and 1A, the flat panel video display cover unit 10 is shown in cross-section in FIG. 1 and in perspective in FIG. 1A. The unit 10 includes a generally rectangular housing 24 whose front edges are surrounded by a bezel 26 which can be of a traditional wood frame or a metal or plastic molding having the usual mitered corners. In FIG. 1, the video display 12 is illustratively shown as being mounted on the back wall of housing 24 which is in turn fastened to a support stud 16. The signal and power wires for the video display 12 are illustratively shown as 18 and these are connected to any suitable driver device, e.g. a television receiver, computer, etc.

Mounted to the side walls of the housing 24 are a pair of brackets 28 which support the ends of a roller 29 on which the cover 30 is mounted in rolled form. The cover 30 can be of any suitable material, e.g. canvas, plastic, composite, etc. The cover 30 can have thereon, if desired, any sort of indicia or decorations 32. Instead of a rolled cover 30, it can be a pleated stack of blind sections.

A suitable system is provided for rolling the cover 30 up and down. This includes, for example, a suitable drive mechanism such as a motor 34 which is mounted to a bracket 36 on the rear wall of the housing 24. The motor 34 can be activated by a manual switch (not shown) of any suitable form such as a push button, rocker, capacitive switch, etc. Alternatively, the motor 34 can be activated by a remote control device 35 such as the standard kind of unit with ultrasonic or infrared signals which are used to control a television receiver. The control for the motor with both an up and a down function is similar to the up and down functions for changing channels in a television receiver. All of this is conventional in the art. The motor remote control also can be "programmed" to respond to signals from the remote control device of the television receiver (not shown) which drives the display screen.

Any suitable pulley or spring loaded system, etc. can be used to assist in raising and lowering of the cover 30. In a typical example, the lower edge of the cover 30 can have a weight 40 so that when the motor is turned on to lower the cover, as the motor unrolls it, the weight 40 will be enough to permit it to descent. The motor has enough power to overcome the weight to raise the cover.

The housing 24 also has a piece of rear internal flange 525 which are mounted to the wall, preferably on the wall studs 16, by any suitable fastener. There also can be holes in the housing rear wall and these used to hang the housing on fasteners mounted on the wall.

FIG. 1B shows a variant of the unit wherein the cover is moved by a handle 60. The cover preferably has a conventional glide 62 which rides in a track 64. The roller 28 can be either spring loaded, like a window shade, or have a rewind knob.

As can be seen, with the cover down (FIG. 1A), the interior of housing 24 is fully covered and the video display panel 12 is both obscured and protected. If the exterior of the cover 30 has a picture thereon, the unit 10, when the display is covered, serves a decorative function.

FIGS. 2 and 2A show another embodiment of the invention which is to be mounted on the wall. Here, the housing 24 is as previously shown, but it is recessed within the wall 14 between the support studs 16, the requisite number of studs having been removed before mounting. Here, the bezel 26 is mounted on the outside of the wall. The housing 24 is fastened to the wall studs 16 by fasteners inserted through the housing side walls.

The operation of the unit of FIGS. 2 and 2A is the same as that of FIGS. 1 and 1A. Here, the outside surface of the cover can be the same as the surrounding wall, in which case the bezel 26 can be made narrower and also covered.

FIG. 2B shows a frame unit box 70 for mounting in the wall to hold the display unit. The box has a rectangular frame 72 of steel or other rigid material. There are flanges 74 on the corners for fastening the frame to the wall studs and a removable cover plate 76 extends across the frame. The motor and screen drive mechanism is located behind the cover.

A track or channel 78 is on the inner face of the frame 72 and the display screen is held between the channel and the front of the box. The box frame also has a number of holes, 75 preferably covered by push out caps of plastic or metal, through which the various power and signal wires can be passed to the different parts of the display unit.

FIGS. 3 and 3A show still another embodiment of the invention. Here, the unit is utilized in connection with a floor 50 -to- ceiling 52 arrangement. The video display panel 12 is mounted in the wall between the support studs 16. Here, the cover itself is mounted within the wall, with the roller bracket 28 mounted on the ceiling, as is the motor drive unit. A fascia 56 is mounted across to cover the cover roller 29 and its drive unit. Again, any suitable switch arrangement can be provided for controlling the motor.

As in the other embodiments, the exterior of the cover 30 can have indicia or decorations to blend in with or contrast the surrounding wall.

Figure 4A:
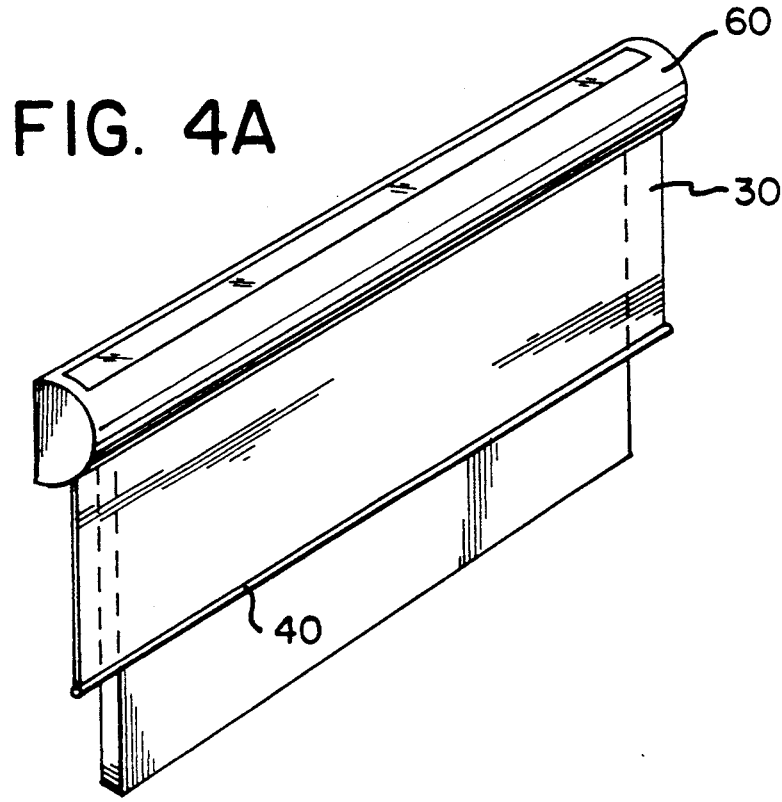
FIG. 4A is a perspective view of the unit of FIG. 4.

FIGS. 4 and 4A show a further embodiment of the invention. Here, the video display part 12 is to be mounted either on the wall or within it. The cover is provided in a casing 60 which is shown as being generally semi-cylindrical in shape. The casing is fastened to the wall. Within the casing 60 can be a luminair 62.

The cover roller 29 and cover 30 are within the casing 60, as is the roller brackets, motor drive and motor control.

As seen, novel cover units are provided to cover a flat panel video display. The cover hides the flat panel display as well as protects it.

What is claimed is:

1. A cover unit for a flat display panel comprising:
a housing,
means for mounting said housing onto a wall surface;
movable cover means within said housing to be disposed in front of the display panel; and
means for moving said cover means to cover and uncover said display panel.

2. A cover unit as in claim 1 wherein said moving means moves said cover means vertically.

3. A cover unit as in claim 2 wherein said cover means is flexible and is moved vertically up and down.

4. A cover unit as in claim 3 wherein said moving means includes a roller into which said cover means is rolled and unrolled.

5. A cover unit as in claim 4 wherein said moving means is manually operated.

6. A cover unit as in claim 4 wherein said moving means is motor operated.

7. A cover unit as in claim 1 wherein said cover means comprises a panel and said moving means moves said panel horizontally.

8. A cover unit as in claim 1 wherein said flat display panel is also mounted within said housing.

9. A cover unit as in claim 8 wherein said display panel is a flat panel video display means.

10. A cover unit as in claim 1 wherein said moving means is motor operated, and said cover unit further comprises means remote from said housing for actuating said motor operated moving means.

11. A cover unit for a flat display panel comprising:
a housing mountable within a wall;
movable cover means within said housing to be disposed in front of the display panel, and
means within said housing for moving said cover means to cover and uncover said display panel.

12. A cover unit as in claim 11 wherein said housing further comprises a box frame for mounting between the wall studs.

13. A cover unit as in claim 11 wherein said moving means is motor operated, and said cover unit further comprises means remote from said cover unit for actuating said motor operated moving means.

14. A cover unit as in claim 11 wherein said display panel is a flat panel video display means.

15. A cover unit for a flat display panel comprising:
a housing mountable within a wall,
a display panel within said housing;
movable cover means within said housing to be disposed in front of the display panel, and
means within said housing for moving said cover means to cover and uncover said display panel.

16. A cover unit as in claim 15 wherein said display panel is a flat panel video display means.

* * * * *

(12) EX PARTE REEXAMINATION CERTIFICATE (7306th)
United States Patent
Pecorino et al.

(10) Number: US 5,264,765 C1
(45) Certificate Issued: Jan. 12, 2010

(54) VIDEO DISPLAY SCREEN COVER

(76) Inventors: Philip A. Pecorino, 140 Mayfair Ave., Floral Park, NY (US) 11001; Aldo Medaglia, 37-10 33rd St., Long Island City, NY (US) 11101

Reexamination Request:
No. 90/010,133, Apr. 2, 2008

Reexamination Certificate for:
Patent No.: 5,264,765
Issued: Nov. 23, 1993
Appl. No.: 07/858,548
Filed: Mar. 27, 1992

(51) Int. Cl.
*H04N 5/64* (2006.01)

(52) U.S. Cl. .................. 318/265; 318/265; 318/286; 318/466; 318/467; 318/468; 160/23.1; 160/34; 160/98; 160/DIG. 10; 177/180; 177/181; 292/216; 292/225; 439/77; 439/78; 439/79; 902/8; 902/20; 902/21; 902/30; 902/41; 248/291

(58) Field of Classification Search .................. None
See application file for complete search history.

(56) References Cited

U.S. PATENT DOCUMENTS 2,668,586 A 2/1954 Luckie .................. 160/241

OTHER PUBLICATIONS

Electric Home Television, Kansas City's First All–Electric Home Brochure, 1954.

*Primary Examiner*—Linh My Nguyen

(57) ABSTRACT

A cover unit for a flat panel video display, for deploying a flexible cover over the display. The cover unit can be separate from the display, both of which can be mounted on or in a wall or the cover unit and flat panel display can be in this same housing which can be mounted on or within a wall.

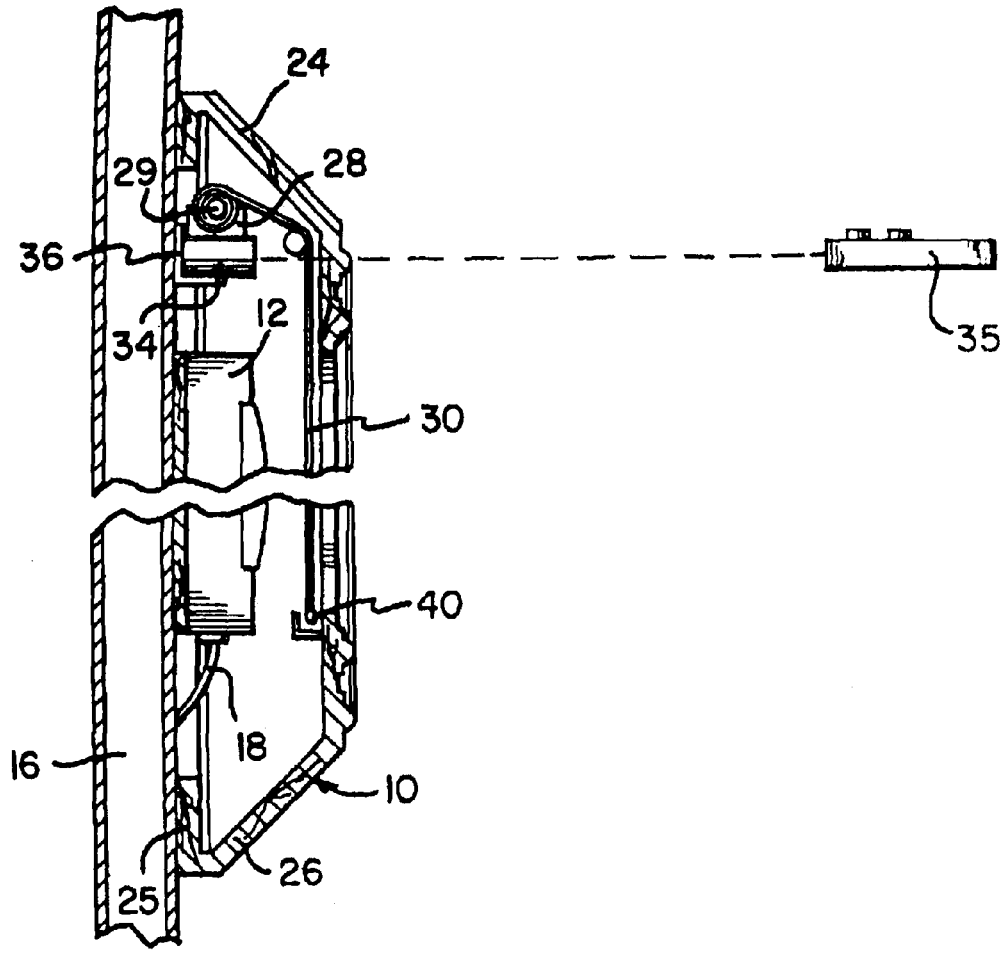

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–16 is confirmed.

New claims 17–26 are added and determined to be patentable.

17. *A cover unit for a flat display panel comprising:*
   *a housing,*
   *means for mounting said housing onto a wall surface;*
   *movable flexible cover means within said housing to be disposed in front of the display panel;*
   *motor operated means for moving said cover means vertically to cover and uncover said display panel; and*
   *means remote from said housing for actuating said motor operated moving means.*
18. *A cover unit for a flat display panel comprising:*
   *a housing mountable within a wall;*
   *movable flexible cover means within said housing to be disposed in front of the display panel,*
   *motor operated means within said housing for moving said cover means vertically to cover and uncover said display panel; and*
   *means remote from said housing for actuating said motor operated moving means.*
19. *A cover unit for a flat display panel comprising:*
   *a housing mountable within a wall,*
   *a display panel within said housing;*
   *movable flexible cover means within said housing to be disposed in front of the display panel;*
   *motor operated means within said housing for moving said cover means vertically to cover and uncover said display panel; and*
   *means remote from said housing for actuating said motor operated moving means.*
20. *A cover unit for a flat display panel comprising:*
   *a housing including one of a flange and a rear wall opening configured to mount the housing onto a wall surface;*
   *a movable cover within said housing configured to be disposed in front of the display panel; and*
   *a remote controllable drive mechanism configured to move the flexible cover so as to cover and uncover the display panel.*
21. *The cover unit for a flat display panel of claim 17, wherein the motor operated means and a television receiver that drives the display panel respond to a signal from the means remote from said housing.*
22. *The cover unit for a flat display panel of claim 18, wherein the motor operated means and a television receiver that drives the display panel respond to a signal from the means remote from said housing.*
23. *The cover unit for a flat display panel of claim 19, wherein the motor operated means and a television receiver that drives the display panel respond to a signal from the means remote from said housing.*
24. *The cover unit for a flat display panel of claim 20, wherein the drive mechanism and a television receiver that drives the display panel respond to a signal from a single remote control device.*
25. *A cover unit for a flat display panel comprising:*
   *a housing including one of a flange and a rear wall opening configured to mount the housing within a wall;*
   *a movable cover within said housing configured to be disposed in front of the display panel; and*
   *a remote controllable drive mechanism configured to move the flexible cover so as to cover and uncover the display panel.*
26. *The cover unit for a flat display panel of claim 25, wherein the drive mechanism and a television receiver that drives the display panel respond to a signal from a single remote control device.*

\* \* \* \* \*